(12) United States Patent
Xi

(10) Patent No.: US 10,191,670 B2
(45) Date of Patent: Jan. 29, 2019

(54) METHOD AND DEVICE OF DATA PROTECTION, STORAGE EQUIPMENT

(71) Applicant: ZTE Corporation, Shenzhen (CN)

(72) Inventor: Zhijun Xi, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 601 days.

(21) Appl. No.: 14/769,636

(22) PCT Filed: Nov. 14, 2013

(86) PCT No.: PCT/CN2013/087153
§ 371 (c)(1),
(2) Date: Aug. 21, 2015

(87) PCT Pub. No.: WO2014/127650
PCT Pub. Date: Aug. 28, 2014

(65) Prior Publication Data
US 2015/0378630 A1 Dec. 31, 2015

(30) Foreign Application Priority Data

Feb. 22, 2013 (CN) .......................... 2013 1 0057355

(51) Int. Cl.
G06F 3/06 (2006.01)
G06F 11/16 (2006.01)
G06F 11/10 (2006.01)

(52) U.S. Cl.
CPC ............ *G06F 3/0619* (2013.01); *G06F 3/065* (2013.01); *G06F 3/0659* (2013.01);
(Continued)

(58) Field of Classification Search
CPC ...... G06F 3/0619; G06F 3/065; G06F 3/0659; G06F 3/0673; G06F 11/1012; G06F 11/167
See application file for complete search history.

(56) References Cited

U.S. PATENT DOCUMENTS 7,620,875 B1 11/2009 Nelson et al.
8,316,280 B2 * 11/2012 Chang ................ G06F 11/1012
714/763

(Continued)

FOREIGN PATENT DOCUMENTS

CN 101477447 A 7/2009
CN 101625897 A 1/2010
CN 102855194 A 1/2013

OTHER PUBLICATIONS

International Search Report for corresponding application PCT/CN2013/087153 filed Nov. 14, 2014; dated Mar. 6, 2014.

(Continued)

*Primary Examiner* — Eric Cardwell
(74) *Attorney, Agent, or Firm* — Cantor Colburn LLP

(57) ABSTRACT

A method and device of data protection and a storage equipment. The method includes: when receiving from a host a writing command, carrying an address and data to be stored, writing the data to be stored into a first storage space, which corresponds to the address, in a storage unit, and writing protection data corresponding to the data to be stored into a second storage space, which corresponds to the address, in a protection unit; when receiving from the host a reading command, carrying the address, determining recovery data according to the data stored in the first storage space and the data stored in the second storage space; and taking the recovery data as response data for the reading command. The method achieves efficient data protection of a storage equipment.

7 Claims, 4 Drawing Sheets

(52) U.S. Cl.
CPC ........ *G06F 3/0673* (2013.01); *G06F 11/1012* (2013.01); *G06F 11/167* (2013.01)

(56) References Cited

U.S. PATENT DOCUMENTS

2012/0117418 A1   5/2012   Gilbert
2012/0210067 A1   8/2012   Abumi

OTHER PUBLICATIONS

Extended European Search Report dated Jan. 21, 2016 re: Application No. 13875479.-1954 / 2960777 PCT/CN2013/087153; pp. 1-7; citing: U.S. Pat. No. 7,620,875 B1, US 2012/210067 A and US 2012/117418 A1.

\* cited by examiner

METHOD AND DEVICE OF DATA PROTECTION, STORAGE EQUIPMENT

TECHNICAL FIELD

The embodiments of the disclosure relate to the information technologies field, and in particular to a method and device of data protection, storage equipment.

BACKGROUND

In some special fields, some data and files are very important, and data loss or error may usually cause significant losses; however, the features of electronic products determine that there could be no completely reliable storage equipment, and no one method could guarantee that loss or error will not occur to all the data.

For the traditional data read-write of one or more storage units in a storage equipment, the storage units store data received from a host according to a write command of the host, and return corresponding storage data to the host according to a read command of the host. However, in practice, since this storage way is not completely reliable, loss or error may occur to data stored in the storage units. Conventional storage equipment protection needs to be supported by a special drive and an application software, and system operating efficiency is not high.

SUMMARY

The embodiments of the disclosure provide a method and device of data protection, a storage equipment, which can realize efficient data protection of a storage equipment.

According to one aspect of the embodiments of the disclosure, a method of data protection is provided, including:

when receiving from a host a write command carrying an address and data to be stored, writing the data to be stored into a first storage space, which corresponds to the address, in a storage unit, and writing protection data corresponding to the data to be stored into a second storage space, which corresponds to the address, in a protection unit; when receiving from the host a read command carrying the address, determining recovery data of the data to be stored according to the data stored in the first storage space and the data stored in the second storage space; and taking the recovery data as response data for the read command.

In an example embodiment, the protection unit includes at least two protection sub-units, and the second storage space comprises respective storage sub-spaces, which correspond to the address, in the at least two protection sub-units;

writing the protection data corresponding the data to be stored into the second storage space, which corresponds to the address, in the protection unit includes: respectively writing the protection data into respective storage sub-spaces, which correspond to the address, in the at least two protection sub-units; and determining the recovery data of the data to be stored according to the data stored in the first storage space and the data stored in the second storage space includes:

determining the recovery data according to the data stored in the first storage space and the data stored in each storage sub-space of the second storage space.

In an example embodiment, the method further includes: performing conversion processing on the data to be stored according to a data conversion mode to obtain the protection data.

determining the recovery data according to the data stored in the first storage space and the data stored in each storage sub-space of the second storage space includes: performing inverse conversion processing corresponding to the conversion processing on the data stored in a first storage sub-space of the second storage space according to the data conversion mode to obtain first inverse conversion processed data; judging whether the data stored in the first storage space is consistent with the inverse conversion processed data corresponding to the first storage sub-space to obtain a first judgement result; when the first judgement result is that the data stored in the first storage space is consistent with the inverse conversion processed data corresponding to the first storage sub-space, determining the data stored in the first storage space to be the recovery data; and when the first judgement result is that data stored in the first storage space is inconsistent with the inverse conversion processed data corresponding to the first storage sub-space, performing inverse conversion processing corresponding to the conversion processing on the data stored in a second storage sub-space of the second storage space to obtain second inverse conversion processed data, and determining the recovery data according to the data stored in the first storage space, the first inverse conversion processed data and the second inverse conversion processed data.

In an example embodiment, determining the recovery data according to the data stored in the first storage space, the first inverse conversion processed data and the second inverse conversion processed data includes: judging whether the first inverse conversion processed data is consistent with the second inverse conversion processed data to obtain a second judgement result; when the second judgement result is that the first inverse conversion processed data is consistent with the second inverse conversion processed data, determining any one of the first inverse conversion processed data and the second inverse conversion processed data to be the recovery data; and when the second judgement result is that the first inverse conversion processed data is inconsistent with the second inverse conversion processed data, determining the data stored in the first storage space to be the recovery data.

In an example embodiment, the data conversion mode is configured by the host.

According to another aspect of the embodiments of the disclosure, a device of data protection is further provided, including: a write component configured to, when receiving from a host a write command carrying an address and data to be stored, write the data to be stored into a first storage space, which corresponds to the address, in a storage unit, and write protection data corresponding to the data to be stored into a second storage space, which corresponds to the address, in a protection unit; a determination component configured to, when receiving from the host a read command carrying the address, determine recovery data of the data to be stored according to the data stored in the first storage space and the data stored in the second storage space; and a response component configured to take the recovery data as response data for the read command.

In an example embodiment, the protection unit includes at least two protection sub-units, and the second storage space includes respective storage sub-spaces, which correspond to the address, in the at least two protection sub-units.

the write component comprises: a write element configured to, when receiving from the host the write command carrying the address and the data to be stored, write the data to be stored into the first storage space, which corresponds to the address, in the storage unit, and respectively write the protection data into the respective storage sub-spaces, which corresponds to the address, in the at least two protection sub-units; and the determination component includes: a determination element configured to, when receiving from the host the read command carrying the address, determine the recovery data according to the data stored in the first storage space and the data stored in each storage sub-space of the second storage space.

In an example embodiment, the device further includes: a conversion component configured to perform conversion processing on the data to be stored according to a data conversion mode to obtain the protection data; and the determination element includes: a conversion sub-element configured to perform inverse conversion processing corresponding to the conversion processing on the data stored in a first storage sub-space of the second storage space according to the data conversion mode to obtain first inverse conversion processed data; a first judgement sub-element configured to judge whether the data stored in the first storage space is consistent with the inverse conversion processed corresponding to the first storage sub-space to obtain a first judgement result; a first determination sub-element configured to, when the first judgement result is that the data stored in the first storage space is consistent with the inverse conversion processed data corresponding to the first storage sub-space, determine the data stored in the first storage space to be the recovery data; and a second determination sub-element configured to, when the first judgement result is that data stored in the first storage space is inconsistent with the inverse conversion processed data corresponding to the first storage sub-space, perform inverse conversion processing corresponding to the conversion processing on the data stored in a second storage sub-space of the second storage space to obtain the second inverse conversion processed data, and determine the recovery data according to the data stored in the first storage space, the first inverse conversion processed data and the second inverse conversion processed data.

In an example embodiment, the second determination sub-element includes: a second judgement sub-element configured to judge whether the first inverse conversion processed is consistent with the second inverse conversion processed data to obtain a second judgement result; a third determination sub-element configured to, when the second judgement result is that the first inverse conversion processed data is consistent with the second inverse conversion processed data, determine any one of the first inverse conversion processed data and the second inverse conversion processed data to be the recovery data; and a fourth determination sub-element configured to, when the second judgement result is that the first inverse conversion processed data is inconsistent with the second inverse conversion processed data, determine the data stored in the first storage space to be the recovery data.

According to another aspect of the embodiments of the disclosure, a storage equipment is provided, including a host, an interface control unit, a storage unit and a protection unit, wherein the interface control unit is respectively connected to the host, the storage unit and the protection unit, and the interface control unit comprises the data protection device mentioned above.

In the embodiments of the disclosure, the protection data corresponding to the data to be stored is written into the protection unit, and when the corresponding read command is received, the recovery data of the data to be stored is determined according to the data stored in the protection unit and the storage unit, and is taken as the response data of the read command, thereby realizing efficient storage equipment data protection.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF THE EMBODIMENTS

In order to make the objects, technical solutions and advantages of the embodiments of the disclosure more apparent, the embodiments of the disclosure are described in detail herein below in conjunction with the accompanying drawings and specific embodiments. It needs to be noted that the embodiments of the present application and the features of the embodiments can be combined with each other if there is no conflict.

Figure 1:
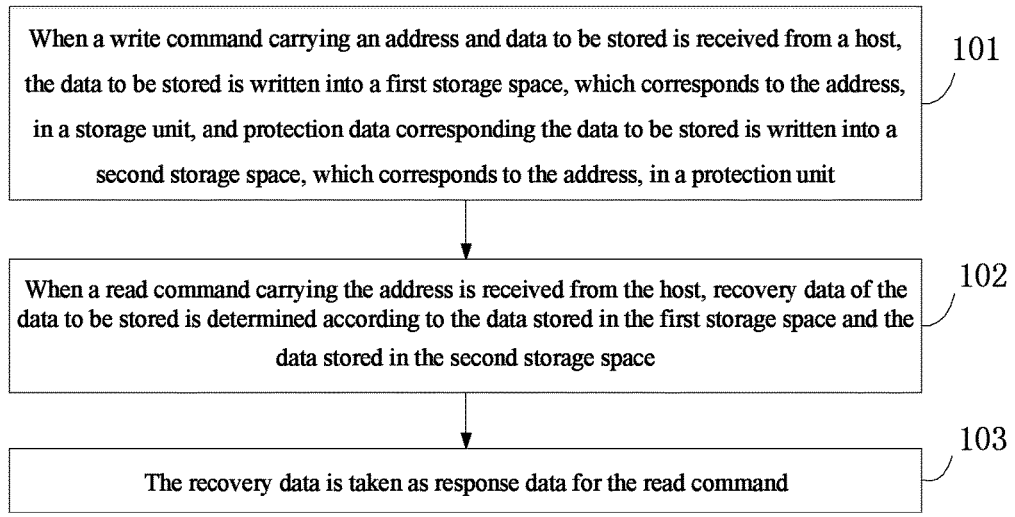
FIG. 1 is a flowchart of a method of data protection according to an embodiment of the disclosure.

FIG. 1 is a flowchart a method of data protection according to an embodiment of the disclosure; as shown in FIG. 1, a data protection method is provided according to the embodiment of the disclosure, and the method includes the following steps:

step 101, when a write command carrying an address and data to be stored is received from a host, the data to be stored is written into a first storage space, which corresponds to the address, in a storage unit, and protection data corresponding the data to be stored is written into a second storage space, which corresponds to the address, in a protection unit;

step 102, when a read command carrying the address is received from the host, recovery data of the data to be stored is determined according to the data stored in the first storage space and the data stored in the second storage space; and step 103: the recovery data is taken as response data for the read command.

It can be seen that the protection data corresponding to the data to be stored is written into the protection unit, and when the corresponding read command is received, the recovery data of the data to be stored is determined according to the data stored in the protection unit and the storage unit, and is taken as the response data of the read command, thereby realizing efficient storage equipment data protection.

The host may be composed of devices, such as CPU and PCI Master, which can actively initiate data operation.

The storage unit and the protection unit may be composed of various storage equipments, which may be various kinds of external storage equipments, for example, SDRAM, FLASH, EEPROM storage chip or flash card.

In an example embodiment, the protection data may include error detection and correction data of the data to be stored, and the recovery data of the data to be stored is determined according to the data stored in the first storage space and the data stored in the second storage space may include:

according to the error detection and correction data in the second storage space, error detection operation to the data stored in the first storage space to obtain an error detection result is performed;

when the error detection result is that an error occurs, the data stored in the first storage space is determined to be the recovery data; and when the error detection result is that no error occurs, error correction processing on the data stored in the first storage space is performed, according to the error detection and correction data, to obtain error correction processed data and the error correction processed data is determined to be the recovery data.

Alternatively, the protection data may also include two or more pieces of replica data of the data to be stored, and the recovery data of the data to be stored is determined according to the data stored in the first storage space and the data stored in the second storage space may include:

whether the data stored in the first storage space is consistent with the data stored in the second storage space corresponding to any one of the two or more pieces of replica data is judged; if they are consistent, the data stored in the first storage space is determined to be the recovery data; otherwise, whether the pieces of data stored in the second storage space respectively corresponding to the two or more pieces of replica data are consistent is judged; if yes, the data stored in the second storage space corresponding to any one of the two or more pieces of replica data is determined to be the recovery data; otherwise, the data stored in the first storage space is determined to the recovery data.

In the embodiments of the disclosure, the protection unit may include at least two protection sub-units, and the second storage space may include respective storage sub-spaces, which correspond to the address, in the at least two protection sub-units;

the protection data corresponding the data to be stored is written into the second storage space, which corresponds to the address, in the protection unit may include:

the protection data is respectively written into respective storage sub-spaces, which correspond to the address, in the at least two protection sub-units; and the recovery data of the data to be stored is determined according to the data stored in the first storage space and the data stored in the second storage space may include:

the recovery data is determined according to the data stored in the first storage space and the data stored in each storage sub-space of the second storage space.

In an example embodiment, the method may further include:

conversion processing is performed to the data to be stored according to a data conversion mode to obtain the protection data; and the recovery data is determined according to the data stored in the first storage space and the data stored in each storage sub-space of the second storage space may include:

inverse conversion processing is performed corresponding to the conversion processing on the data stored in a first storage sub-space of the second storage space according to the data conversion mode to obtain first inverse conversion processed data;

whether the data stored in the first storage space is consistent with the inverse conversion processed data corresponding to the first storage sub-space is judged to obtain a first judgement result;

when the first judgement result is that the data stored in the first storage space is consistent with the inverse conversion processed data corresponding to the first storage sub-space, the data stored in the first storage space is determined to be the recovery data; and when the first judgement result is that data stored in the first storage space is inconsistent with the inverse conversion processed data corresponding to the first storage sub-space, the inverse conversion processing is performed corresponding to the conversion processing on the data stored in a second storage sub-space of the second storage space to obtain second inverse conversion processed data, and the recovery data is determined according to the data stored in the first storage space, the first inverse conversion processed data and the second inverse conversion processed data.

The data conversion mode may include at least one of the followings: flipping data, performing processing through certain error correction algorithms, etc.

The recovery data is determined according to the data stored in the first storage space, the first inverse conversion processed data and the second inverse conversion processed data may include:

whether the first inverse conversion processed data is consistent with the second inverse conversion processed data is judged to obtain a second judgement result;

when the second judgement result is that the first inverse conversion processed data is consistent with the second inverse conversion processed data, any one of the first inverse conversion processed data and the second inverse conversion processed data is determined to be the recovery data; and when the second judgement result is that the first inverse conversion processed data is inconsistent with the second inverse conversion processed data, the data stored in the first storage space is determined to be the recovery data.

Here, the at least two protection sub-units may be, for example, at least two storage read-write components. Since the possibility of an error occurring to the at least two storage read-write components at the same time is very small, reliable data storage protection is realized.

In addition, the data conversion mode may be a pre-set default mode, or may be configured by the host, for example, the data conversion mode can be configured by the host carrying mode indication information in the write command.

In order to further illustrate the embodiments of the disclosure clearly, example embodiments of the disclosure are described below.

Figure 2:
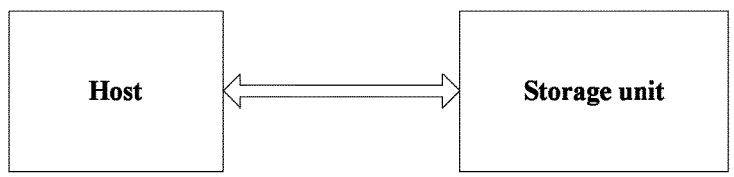
FIG. 2 is a design structural schematic diagram of a conventional storage equipment.

FIG. 2 is a design structural schematic diagram of a conventional storage equipment; and as shown in FIG. 2, a host directly writes data into a storage space, corresponding to a certain address, of a storage unit, and reads the data from the storage space.

Figure 3A:
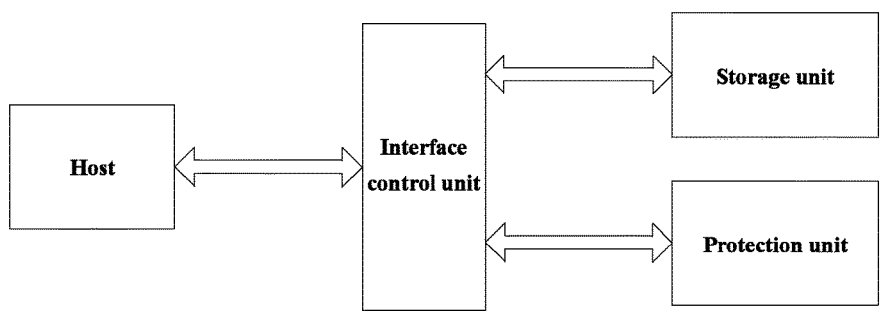
FIG. 3A is a design structural schematic diagram of a storage equipment having a real-time protection function.
Figure 3B:
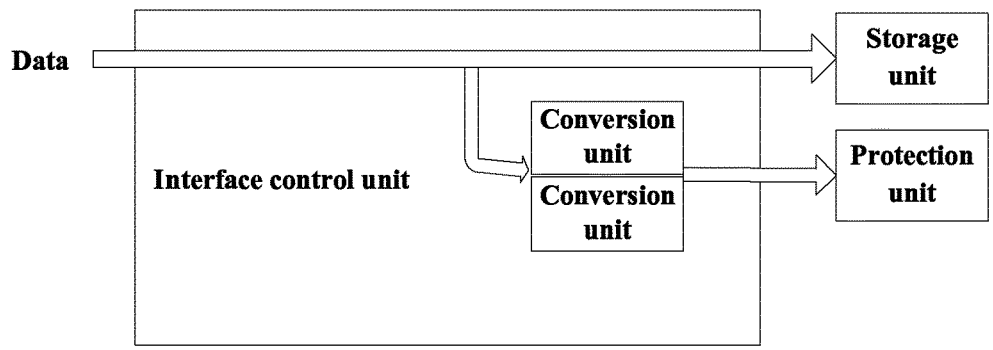
FIG. 3B is an implementation schematic diagram of an interface control unit in FIG. 3A.

FIG. 3A is a design structural schematic diagram of a storage equipment having a real-time protection function according to an example embodiment, and FIG. 3B is an implementation schematic diagram of an interface control unit in FIG. 3A; and as shown in FIG. 3A and FIG. 3B, the interface control unit is respectively corrected to a host, a storage unit and a protection unit, and the interface control unit directly issues data to the storage unit, and writes converted data, obtained from a conversion unit, into the protection unit.

Figure 4:
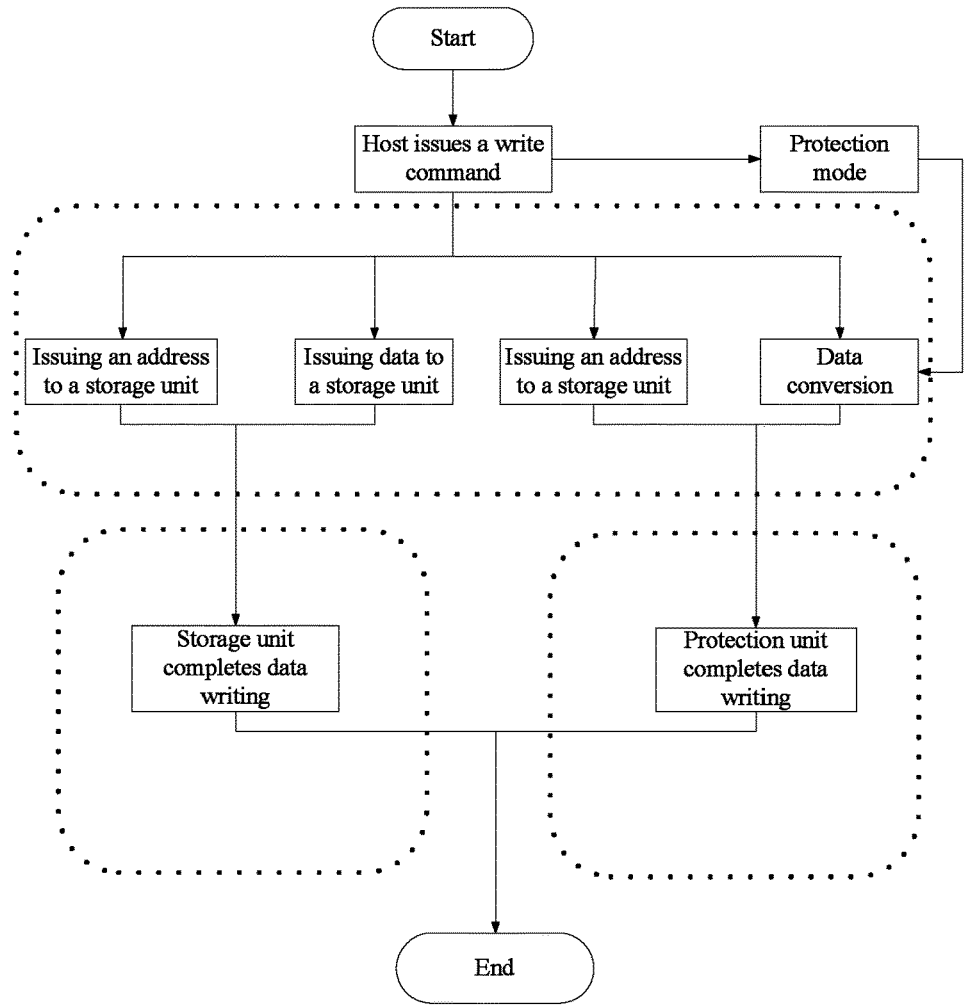
FIG. 4 is a data writing flowchart diagram of a storage equipment having a real-time protection function.

Corresponding to FIG. 3A and FIG. 3B, the data writing flowchart of a storage equipment having a real-time protection function according to an example embodiment is as shown in FIG. 4, and the specific steps are as follows:

step 401, this processing flowchart starts;

step 402, a host issues a write command to an interface conversion unit;

step 403, the interface conversion unit directly sends an address carried in the write command to a storage equipment;

step 404, the interface conversion unit directly sends data carried in the write command to the storage equipment;

step 405, according to a data conversion mode of a default configuration of the interface conversion unit or the data conversion mode configured by the write command sent from the host, the interface conversion unit sends converted data to a protection unit; and step 406, this flowchart ends.

Figure 5:
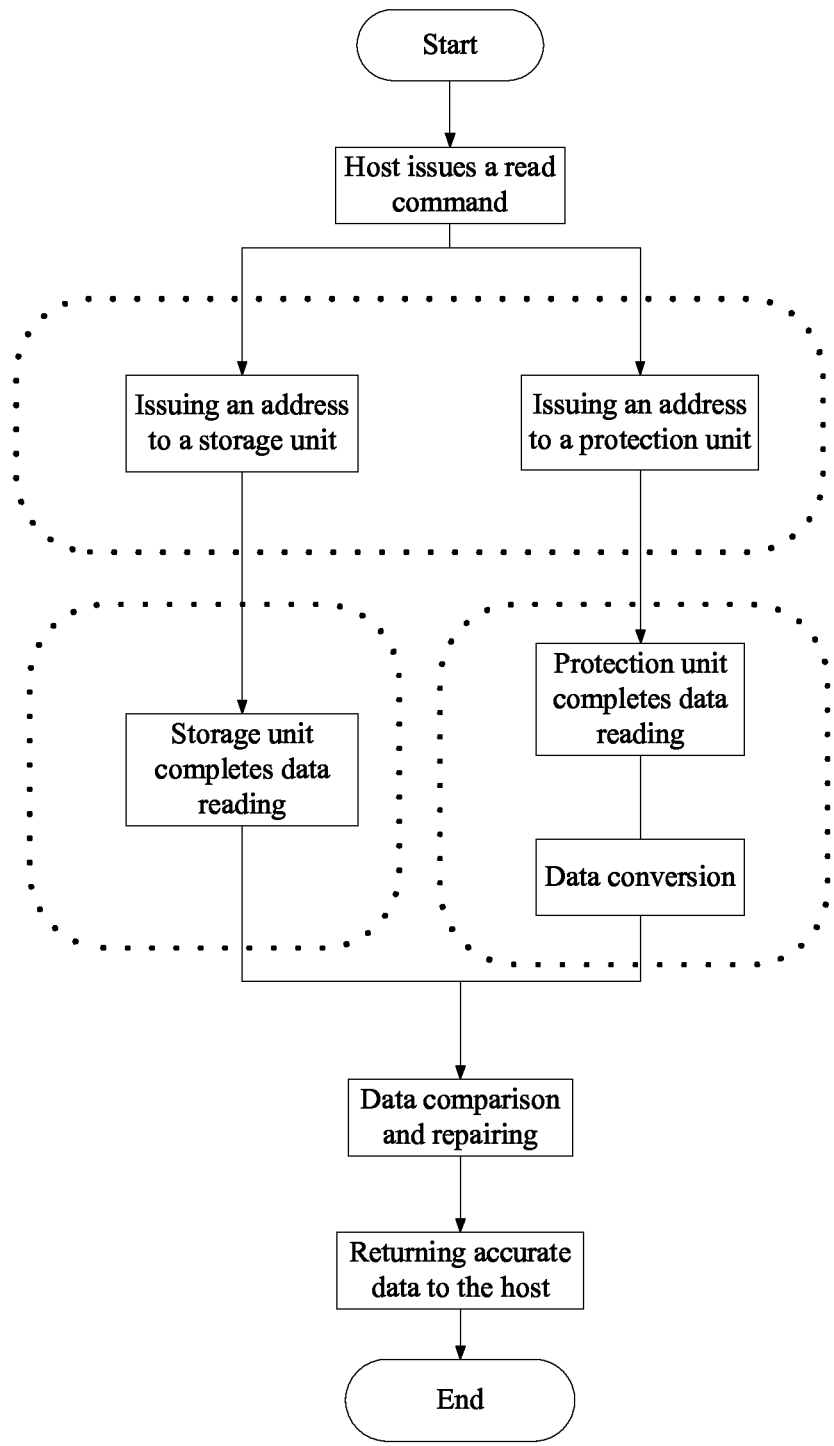
FIG. 5 is a data reading flowchart diagram of a storage equipment having a real-time protection function.
Figure 6:
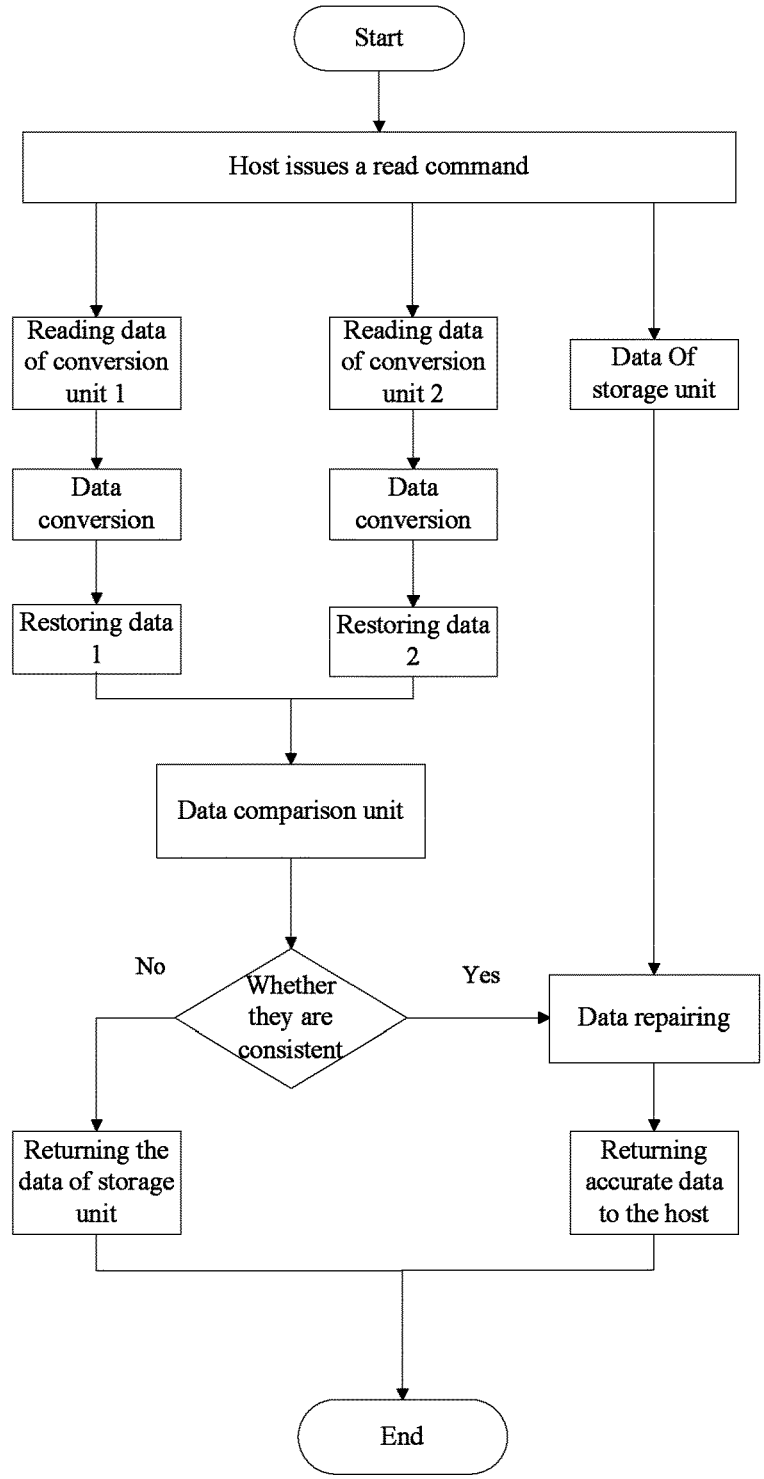
FIG. 6 is a flowchart diagram of data automatic recovery.

FIG. 5 is a data reading flowchart diagram of a storage equipment having a real-time protection function according to an example embodiment; and as shown in FIG. 5, the specific steps of the data reading flowchart of the storage equipment having the real-time protection function are as follows:

step 501, this processing flowchart starts;

step 502, a host issues a data reading command to an interface conversion unit;

step 503, the interface conversion unit directly issues an address carried in the data reading command to a storage unit and a protection unit; and step 504, according to the conversion mode adopted in the writing flowchart mentioned above, the interface conversion unit performs inverse conversion to the data read back from the protection unit to obtain the converted data, and compares the converted data with the data read back from the storage unit; if they are consistent, then the data read back from the storage unit is directly returned to the host, and the flowchart ends; and if they are inconsistent, then it is detected that an error occurs, and the data automatic repairing flowchart as shown in FIG. 6 is proceeded to.

FIG. 6 is a data automatic repairing flowchart diagram according to an example embodiment of the disclosure; and as shown in FIG. 6, the specific steps of the data automatic repairing flowchart are as follows:

step 601, this processing flowchart starts;

step 602, an interface conversion unit restores data in two conversion units (setting as conversion unit 1 and conversion unit 2) simultaneously to form data restored 1 and data restored 2;

step 603, the data restored 1 and the data restored 2 are compared; if they are inconsistent, then it is indicated that restored data formed by the interface conversion unit is wrong, and the data read back from a storage unit is directly returned to a host;

step 604, the data restored 1 and the data restored 2 are compared; if they are consistent, then it is confirmed that data restored is correct; and data of the storage unit is repaired according to the data restored, and the data restored 1 or the data restored 2 (i.e. "correct data" in the figure) is returned to the host; and step 605, this flowchart ends.

A device of data protection is further provided in the embodiments of the disclosure, and the device includes:

a write component ,which is configured to, when receiving from a host a write command carrying an address and data to be stored, write the data to be stored into a first storage space, which corresponds to the address, in a storage unit and write protection data corresponding the data to be stored into a second storage space, which corresponds to the address, in a protection unit;

a determination component, which is configured to, when receiving from the host a read command carrying the address, determine recovery data of the data to be stored according to the data stored in the first storage space and the data stored in the second storage space; and a response component, which is configured to take the recovery data as response data for the read command It can be seen that the protection data corresponding to the data to be stored is written into the protection unit, and when the corresponding read command is received, the recovery data of the data to be stored is determined according to the data stored in the protection unit and the storage unit, and is taken as the response data of the read command, thereby realizing efficient storage equipment data protection.

The protection unit may include at least two protection sub-units, and the second storage space may comprise respective storage sub-spaces, which correspond to the address, of the at least two protection sub-units;

the write component may include:

a write element, which is configured to, when receiving from the host the write command carrying the address and the data to be stored, write the data to be stored into the first storage space, which corresponds to the address, in the storage unit, and respectively write the protection data into the respective storage sub-spaces, which correspond to the address, in the at least two protection sub-units; and the determination component may include:

a determination element, which is configured to, when receiving from the host the read command carrying the address, determine the recovery data according to the data stored in the first storage space and the data stored in each storage sub-space of the second storage space.

In an example embodiment, the device may further include:

a conversion component, which is configured to perform conversion processing on the data to be stored according to a data conversion mode to obtain the protection data; and the determination element may include:

a conversion sub-element, which is configured to perform inverse conversion processing corresponding to the conversion processing on the data stored in a first storage sub-space of the second storage space according to the data conversion mode to obtain first inverse conversion processed data;

a first judgement sub-element, which is configured to judge whether the data stored in the first storage space is consistent with inverse conversion processed data corresponding to the first storage sub-space to obtain a first judgement result;

a first determination sub-element, which is configured to, when the first judgement result is that the data stored in the first storage space is consistent with the inverse conversion processed data corresponding to the first storage sub-space, determine the data stored in the first storage space to be the recovery data; and a second determination sub-element, which is configured to, when the first judgement result is that data stored in the first storage space is inconsistent with the inverse conversion processed data corresponding to the first storage sub-space, perform inverse conversion processing corresponding to the conversion processing on the data stored in a second storage sub-space of the second storage space to obtain second inverse conversion processed data, and determine the recovery data according to the data stored in the first storage space, the first inverse conversion processed data and the second inverse conversion processed data.

The second determination sub-element may include:
a second judgement sub-element, which is configured to judge whether the first inverse conversion processed data is consistent with the second inverse conversion processed data to obtain a second judgement result;
a third determination sub-element, which is configured to, when the second judgement result is that the first inverse conversion processed data is consistent with the second inverse conversion processed data, determine any one of the first inverse conversion processed data and the second inverse conversion processed data to be the recovery data; and
a fourth determination sub-element, which is configured to, when the second judgement result is that the first inverse conversion processed data is inconsistent with the second inverse conversion processed data, determine the data stored in the first storage space to be the recovery data.

A storage equipment is further provided in the embodiments of the disclosure. The storage equipment includes a host, an interface control unit, a storage unit and a protection unit, wherein the interface control unit is respectively connected to the host, the storage unit and the protection unit, and the interface control unit includes the data protection device mentioned above.

The interface control unit may be composed of a programmable logic device (PLD) or an ASIC chip.

Conventional storage equipment protection is generally implemented by the solution of combing software with hardware; on one hand, the cost is relatively high, and what is most critical is that the solution should be supported by special software, so that a particular requirement is proposed for the development of conventional products; and the above-mentioned storage equipment provided in the embodiments of the disclosure is applicable to an embedded system or other small and medium-sized equipments, is simple to implement, has no particular requirements on driving and application software, and is completely implemented by hardware, and system operation efficiency thereof is very high.

What is described above is an implementation of the embodiments of the disclosure. It is to be noted that the person skilled in the art may make several improvements and polishment without departing from the principle of the embodiments of the disclosure, and these improvements and polishment should also be regarded as being within the scope of protection of the embodiments of the disclosure.

INDUSTRIAL APPLICABILITY

In the technical solution provided by the disclosure, protection data corresponding to data to be stored is written into a protection unit, and when a corresponding read command is received, recovery data of the data to be stored is determined according to the data stored in the protection unit and a storage unit, and is taken as response data of the read command, thereby realizing efficient storage equipment data protection.

What is claimed is:
1. A method of data protection, comprising:
when receiving from a host a write command carrying an address and data to be stored, writing the data to be stored into a first storage space, which corresponds to the address, in a storage unit, and performing conversion processing on the data to be stored according to a data conversion mode to obtain protection data corresponding the data to be stored;
respectively writing the protection data into respective storage sub-spaces, which correspond to the address, in at least two protection sub-units included in a protection unit;
when receiving from the host a read command carrying the address, according to the data conversion mode, performing inverse conversion processing corresponding to the conversion processing on the data stored in a first storage sub-space of the storage sub-spaces to obtain first inverse conversion processed data; judging whether the data stored in the first storage space is consistent with the inverse conversion processed data corresponding to the first storage sub-space to obtain a first judgement result; when the first judgement result is that the data stored in the first storage space is consistent with the inverse conversion processed data corresponding to the first storage sub-space, determining the data stored in the first storage space to be the recovery data; and when the first judgement result is that data stored in the first storage space is inconsistent with the inverse conversion processed data corresponding to the first storage sub-space, performing inverse conversion processing corresponding to the conversion processing on the data stored in a second storage sub-space of the storage sub-spaces to obtain second inverse conversion processed data, and determining the recovery data according to the data stored in the first storage space, the first inverse conversion processed data and the second inverse conversion processed data; and
taking the recovery data as response data for the read command.

2. The method according to claim 1, wherein determining the recovery data according to the data stored in the first storage space, the first inverse conversion processed data and the second inverse conversion processed data comprises:
judging whether the first inverse conversion processed data is consistent with the second inverse conversion processed data to obtain a second judgement result;
when the second judgement result is that the first inverse conversion processed data is consistent with the second inverse conversion processed data, determining any one of the first inverse conversion processed data and the second inverse conversion processed data to be the recovery data; and
when the second judgement result is that the first inverse conversion processed data is inconsistent with the second inverse conversion processed data, determining the data stored in the first storage space to be the recovery data.

3. The method according to claim 1, wherein the data conversion mode is configured by the host.

4. A device of data protection, comprising:
a write component configured to, when receiving from a host a write command, carrying an address and data to be stored write the data to be stored into a first storage space, which corresponds to the address, in a storage unit and respectively writing protection data corresponding the data to be stored into respective storage sub-spaces, which correspond to the address, in at least two protection sub-units included in a protection unit;
a conversion component configured to perform conversion processing on the data to be stored according to a data conversion mode to obtain the protection data;

a conversion sub-element configured to when receiving from the host a read command carrying the address, perform inverse conversion processing corresponding to the conversion processing on the data stored in a first storage sub-space of the sub-storage spaces according to the data conversion mode to obtain first inverse conversion processed data;

a first judgement sub-element configured to judge whether the data stored in the first storage space is consistent with inverse conversion processed data corresponding to the first storage sub-space to obtain a first judgement result;

a first determination sub-element configured to, when the first judgement result is that the data stored in the first storage space is consistent with the inverse conversion processed data corresponding to the first storage sub-space, determine the data stored in the first storage space to be a recovery data of the data to be stored; and a second determination sub-element configured to, when the first judgement result is that data stored in the first storage space is inconsistent with the inverse conversion processed data corresponding to the first storage sub-space, perform inverse conversion processing corresponding to the conversion processing on the data stored in a second storage sub-space of the storage sub-spaces to obtain second inverse conversion processed data, and determine the recovery data according to the data stored in the first storage space, the first inverse conversion processed data and the second inverse conversion processed data; and a response component configured to take the recovery data as response data for the read command.

5. The device according to claim 4, wherein the second determination sub-element comprises:

a second judgement sub-element configured to judge whether the first inverse conversion processed data is consistent with the second inverse conversion processed data to obtain a second judgement result;

a third determination sub-element configured to, when the second judgement result is that the first inverse conversion processed data is consistent with the second inverse conversion processed data, determine any one of the first inverse conversion processed data and the second inverse conversion processed data to be the recovery data; and a fourth determination sub-element configured to, when the second judgement result is that the first inverse conversion processed data is inconsistent with the second inverse conversion processed data, determine the data stored in the first storage space to be the recovery data.

6. A storage equipment, comprising: a host, an interface control unit, a storage unit and a protection unit, wherein the interface control unit is respectively connected to the host, the storage unit and the protection unit, and the interface control unit comprises the data protection device as claimed in claim 5.

7. A storage equipment, comprising: a host, an interface control unit, a storage unit and a protection unit, wherein the interface control unit is respectively connected to the host, the storage unit and the protection unit, and the interface control unit comprises the data protection device as claimed in claim 4.

* * * * *